US011078353B2

(12) United States Patent
Zhang et al.

(10) Patent No.: US 11,078,353 B2
(45) Date of Patent: Aug. 3, 2021

(54) THERMOPLASTIC POLYOLEFIN COMPOSITIONS USEFUL FOR ALDEHYDE ABATEMENT

(71) Applicant: Dow Global Technologies LLC, Midland, MI (US)

(72) Inventors: Yahong Zhang, Shanghai (CN); Jian Zou, Shanghai (CN); Shaoguang Feng, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 54 days.

(21) Appl. No.: 16/617,397

(22) PCT Filed: May 22, 2018

(86) PCT No.: PCT/US2018/033792
§ 371 (c)(1),
(2) Date: Nov. 26, 2019

(87) PCT Pub. No.: WO2018/222437
PCT Pub. Date: Dec. 6, 2018

(65) Prior Publication Data
US 2020/0157330 A1 May 21, 2020

(30) Foreign Application Priority Data

May 29, 2017 (WO) ............... PCT/CN2017/086485

(51) Int. Cl.
| | |
|---|---|
| *C08K 5/07* | (2006.01) |
| *C08K 5/103* | (2006.01) |
| *C08L 23/12* | (2006.01) |
| *C08L 23/16* | (2006.01) |
| *C08L 23/14* | (2006.01) |

(52) U.S. Cl.
CPC ............... *C08L 23/14* (2013.01); *C08K 5/07* (2013.01); *C08K 5/103* (2013.01); *C08L 23/12* (2013.01); *C08L 23/16* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | |
|---|---|---|
| 5,272,236 A | 12/1993 | Lai et al. |
| 5,278,272 A | 1/1994 | Lai et al. |
| 5,986,028 A | 11/1999 | Lai et al. |
| 2003/0195299 A1* | 10/2003 | Stevens ............... C08F 10/00 525/240 |
| 2004/0081795 A1 | 4/2004 | Wang et al. |
| 2009/0227758 A1 | 9/2009 | Miyazaki |
| 2010/0124524 A1 | 5/2010 | Green et al. |
| 2011/0160368 A1 | 6/2011 | Bohling et al. |
| 2011/0272621 A1* | 11/2011 | Jaffrennou ............ C08G 8/28 252/62 |
| 2011/0300359 A1 | 12/2011 | Blanchard et al. |
| 2012/0132851 A1 | 5/2012 | Blanchard et al. |
| 2012/0245267 A1* | 9/2012 | Blanchard ............ C09D 133/08 524/218 |
| 2013/0233739 A1 | 9/2013 | Zhao et al. |
| 2016/0024319 A1 | 1/2016 | Blanchard et al. |
| 2016/0304686 A1 | 10/2016 | Otero Martinez et al. |

FOREIGN PATENT DOCUMENTS

| | | | |
|---|---|---|---|
| CN | 1840576 A | 10/2006 | |
| CN | 101717548 A | 6/2010 | |
| CN | 102372873 A | 3/2012 | |
| CN | 1035589072 A | 2/2014 | |
| CN | 103788471 A | 5/2014 | |
| CN | 106243483 A | 12/2016 | |
| EP | 1988122 A1 | 11/2008 | |
| EP | 2108679 A1 | 10/2009 | |
| EP | 2284219 A1 | 2/2011 | |
| JP | 2005179423 A | 7/2005 | |
| WO | WO-2014191573 A1 * | 12/2014 | ........... C09D 133/14 |
| WO | 2015/082316 A1 | 6/2015 | |

OTHER PUBLICATIONS

Kang, P. et al., "Formation and Emissions of Volatile Organic Compounds from Homo-PP and Co-PP Resins during Manufacturing Process and Accelerated Photoaging Degradation". Molecules 2020, 25, 2761, 1-21. (Year: 2020).*
PCT/CN2017/086485, International Search Report and Written Opinion dated Feb. 28, 2018.
PCT/US2018/033792, International Search Report and Written Opinion dated Oct. 29, 2018.

* cited by examiner

*Primary Examiner* — Richard A Huhn
(74) *Attorney, Agent, or Firm* — Cheney Huang

(57) ABSTRACT

The present disclosure provides a composition comprising: (A) a polypropylene polymer; (B) a polyolefin elastomer; (C) a polyacetoacetate compound having the Formula (I); and (D) an additive component. The present disclosure also provides an article made from the composition.

15 Claims, No Drawings

THERMOPLASTIC POLYOLEFIN COMPOSITIONS USEFUL FOR ALDEHYDE ABATEMENT

BACKGROUND

The present disclosure relates to thermoplastic polyolefin compositions useful for aldehyde abatement.

Automobile interior parts are typically made of thermoplastic polyolefin (TPO) compositions, such as TPO compositions containing polyolefin elastomer (POE). Increasing pressures and consumer concerns on car interior air quality have led to government regulations that limit the concentration of volatile organic compounds (VOCs), such as aldehydes, permissible in automobile interior parts. For example, certain government regulations have been recently implemented which limit the concentration of aldehydes in automobile interior parts to less than 0.10 mg/m$^3$ formaldehyde, less than 0.05 mg/m$^3$ acetaldehyde, and less than 0.05 mg/m$^3$ acrolein.

A need exists for a thermoplastic polyolefin composition useful for aldehyde abatement. A need also exists for an aldehyde abatement thermoplastic polyolefin composition that significantly reduces aldehyde, maintains the balance of mechanical properties important for automobile interior parts, such as sufficient toughness and stiffness, and is cost-effective.

SUMMARY OF THE INVENTION

In certain embodiments, the present disclosure provides a composition comprising:
(A) a polypropylene polymer;
(B) a polyolefin elastomer; and
(C) a polyacetoacetate compound,
wherein the polyacetoacetate compound has the Formula (I):

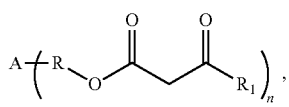

wherein
A is a polymer backbone, a $C_1$-$C_{30}$ substituted or unsubstituted linear or branched alkyl, aryl, arylalkyl, or alkaryl group, wherein the substituents may be one or more O, N, S, halogen, or phosphine;
R is a bond or a $C_1$-$C_{30}$ linear or branched alkyl, aryl, arylalkyl, or alkaryl group;
$R_1$ is a substituted or unsubstituted $C_1$-$C_6$ alkyl or a substituted or unsubstituted aryl group; and
n is 2 to 100.

Optionally, in certain embodiments, the composition of the present disclosure may further comprise (D) an additive component and/or (E) a compatibilizer.

In certain embodiments, the present disclosure provides a composition comprising:
(A) from 50 wt % to 85 wt % of a polypropylene polymer;
(B) from 5 wt % to 35 wt % of a polyolefin elastomer;
(C) from 0.01 wt % to 10 wt % of a polyacetoacetate compound having the Formula (I);
(D) from 0 wt % to 30 wt % of an additive component; and
(E) from 0 wt % to 10 wt % of a compatibilizer.

In certain embodiments, the present disclosure provides an article made from a composition comprising:
(A) a polypropylene polymer;
(B) a polyolefin elastomer; and
(C) a polyacetoacetate compound having the Formula (I).
Optionally, in certain embodiments, an article made from the composition of the present disclosure may further comprise (D) an additive component and/or (E) a compatibilizer.

DETAILED DESCRIPTION

Definitions

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value, as well as decimal values. For ranges containing explicit values (e.g., 1 to 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

An "elastomer" is a polymer that experiences large reversible deformations under relatively low stress. Elastomers can either be thermoplastic or thermoset. "Thermoplastic elastomers" are elastomers having thermoplastic properties. That is, thermoplastic elastomers are optionally molded or otherwise shaped and reprocessed at temperatures above their melting or softening point. The polyolefin elastomers suitable for use herein are thermoplastic elastomers.

An "ethylene-based polymer," "ethylene polymer," or "polyethylene" is a polymer that contains equal to or greater than 50 wt %, or a majority amount of, polymerized ethylene monomer (based on the total weight of the polymer) and, optionally, may contain at least one comonomer. The generic term "polyethylene" thus includes polyethylene homopolymer and polyethylene interpolymer.

An "ethylene/α-olefin polymer" is a polymer that contains equal to or greater than 50 wt %, or a majority amount of, polymerized ethylene, based on the weight of the polymer, and one or more α-olefin comonomers.

A "homopolymer" is a polymer comprising repeating units derived from a single monomer type, but does not exclude residual amounts of other components used in preparing the homopolymer, such as chain transfer agents.

"Olefin polymer," "olefinic polymer," "olefinic interpolymer," "polyolefin" and like terms refer to a polymer derived from simple olefins. A "polyolefin" contains equal to or greater than 50 wt %, or a majority amount of, polymerized olefin monomer (based on the total weight of the polymer) and, optionally, may contain at least one comonomer. Non-limiting examples of α-olefin monomer include $C_2$, or $C_3$ to $C_4$, or $C_6$, or $C_8$, or $C_{10}$, or $C_{12}$, or $C_{16}$, or $C_{18}$, or $C_{20}$ α-olefins, such as ethylene, propylene, 1-butene, 1-hexene, 4-methyl-1-pentene, and 1-octene. Representative polyolefins include polyethylene, polypropylene, polybutene, polyisoprene, and their various interpolymers.

A "polymer" is a compound prepared by polymerizing monomers, whether of the same or a different type, that in polymerized form provide the multiple and/or repeating "units" or "mer units" that make up a polymer. "Polymer"

includes homopolymers, copolymers, terpolymers, interpolymers, and so on. "Polymer" also embraces all forms of copolymer, e.g., random, block, etc. An "interpolymer" is a polymer prepared by the polymerization of at least two types of monomers or comonomers. "Interpolymer" includes, but is not limited to, copolymers (which usually refers to polymers prepared from two different types of monomers or comonomers), terpolymers (which usually refers to polymers prepared from three different types of monomers or comonomers), tetrapolymers (which usually refers to polymers prepared from four different types of monomers or comonomers), and the like. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "polypropylene polymer," "propylene-based polymer," or "propylene polymer," is a polymer that contains equal to or greater than 50 wt %, or a majority amount of, polymerized propylene monomer (based on the total weight of the polymer) and, optionally, may contain at least one comonomer. The generic term "polypropylene" thus includes propylene homopolymer, propylene interpolymer, a blend of two or more propylene homopolymers, a blend of two or more propylene interpolymers, and a blend of one or more propylene homopolymers with one or more propylene interpolymers.

"Polystyrene" is an aromatic polymer prepared from styrene monomer as the only type of monomer. Thus, polystyrene is a styrene homopolymer. The generic term "polystyrene" includes impact modified polystyrene.

A "styrenic block copolymer" is an elastomer having at least one block segment of a styrenic monomer in combination with another block segment of another comonomer. The structure of the styrene block copolymers can be of the linear or radial type, and of the diblock or triblock type. Styrenic block copolymers are available from Dexco Polymers under the trademark VECTOR, from Kraton Corporation under the trademark KRATON, and from Dynasol under the trademark SOLPRENE.

A "thermoplastic" material is a linear or branched polymer which can be repeatedly softened and made flowable when heated and returned to a hard state when cooled to room temperature. In addition, thermoplastics can be molded or extruded into articles of any predetermined shape when heated to the softened state.

(A) Polypropylene Polymer

The present composition comprises a polypropylene polymer. In certain embodiments, the present composition comprises from 50 wt % to 85 wt % (e.g., from 50 wt % to 80 wt %, from 55 wt % to 75 wt %, from 60 wt % to 70 wt %, from 60 wt % to 65 wt %, from 61 wt % to 64 wt %, and/or from 62 wt % to 63 wt %) of a polypropylene polymer, based on the total weight of the composition. Said in another way, in certain embodiments, the composition includes from 50 wt %, or 55 wt %, or 60 wt %, or 61 wt %, or 62 wt % to 63 wt %, or 64 wt %, or 65 wt %, or 70 wt %, or 75 wt %, or 80 wt %, or 85 wt % of a polypropylene polymer, based on the total weight of the composition.

In certain embodiments, the polypropylene polymer contains from greater than 50 wt %, or 60 wt %, or 70 wt %, or 75 wt % to 80 wt %, or 90 wt %, or 95 wt %, or 98 wt %, or 99 wt %, or 100 wt % polymerized propylene monomer, based on the total weight of the polymer. The remainder of the polypropylene polymer is derived from units of ethylene and/or an α-olefin having from 4, or 6 to 8, or 12, or 16, or 20 carbon atoms. In an embodiment, the α-olefin is a $C_4$-$C_{20}$ linear, branched, or cyclic α-olefin.

Nonlimiting examples of suitable polypropylene polymers include polypropylene homopolymer (such as Braskem™ Polypropylene H502-25RZ); polypropylene random copolymer (such as Braskem™ Polypropylene R751-12N); polypropylene impact copolymer (such as YUPLENE™ BX3900 available from SK Global Chemical, and Braskem™ Polypropylene T702-12N); graft polypropylene copolymers; and block propylene copolymers (such as polypropylene olefin block copolymers (PP-OBC) available from The Dow Chemical Company).

In various embodiments, the polypropylene polymer is a polypropylene impact copolymer.

In various embodiments, the polypropylene polymer has a density from 0.890 to 0.920 g/cm³ (e.g., from 0.890 to 0.915 g/cm³, from 0.890 to 0.910 g/cm³, from 0.895 to 0.905 g/cm³, etc.) in accordance with ASTM D792. Said in another way, in various embodiments, the polypropylene polymer has a density from 0.890 g/cm³, or 0.895 g/cm³, or 0.900 g/cm³ to 0.905 g/cm³, or 0.910 g/cm³, or 0.915 g/cm³, or 0.920 g/cm³ in accordance with ASTM D792.

In various embodiments, the polypropylene polymer has a melt flow rate from 30 g/10 min to 100 g/10 min (e.g., from 40 to 90 g/10 min, from 45 to 80 g/10 min, from 50 to 70 g/10 min, from 55 to 65 g/10 min, etc.) in accordance with ASTM D1238 (230° C./2.16 kg). Said in another way, in various embodiments, the polypropylene polymer has a melt flow rate from 30 g/10 min, or 40 g/10 min, or 50 g/10 min, or 55 g/10 min, or 60 g/10 min to 65 g/10 min, or 70 g/10 min, or 80 g/10 min, or 90 g/10 min, or 100 g/10 min (ASTM D1238, 230° C./2.16 kg).

Polypropylene suitable for use herein can have one, some, or all of the following properties:

(a) a density from 0.890 g/cm³, or 0.895 g/cm³, or 0.900 g/cm³ to 0.905 g/cm³, or 0.910 g/cm³, or 0.915 g/cm³, or 0.920 g/cm³ in accordance with ASTM D792; and/or (b) a melt flow rate from 50 g/10 min, or 55 g/10 min, or 60 g/10 min to 65 g/10 min, or 70 g/10 min, or 80 g/10 min, or 90 g/10 min, or 100 g/10 min in accordance with ASTM D1238 (230° C./2.16 kg).

In one or more embodiments, the polypropylene polymer is a polypropylene impact copolymer with a density of 0.90 g/cm³ (ASTM D792) and a melt flow rate of 60 g/10 min (ASTM D1238, 230° C./2.16 kg).

The polypropylene polymer may comprise one or more embodiments disclosed herein.

(B) Polyolefin Elastomer

The present composition comprises a polyolefin elastomer. In certain embodiments, the present composition comprises from 5 wt % to 35 wt % (e.g., from 10 wt % to 35 wt %, from 15 wt % to 30 wt %, from 15 wt % to 25 wt %, from 20 wt % to 25 wt %, from 20 wt % to 23 wt %, and/or from 20 wt % to 21 wt %) of a polyolefin elastomer, based on the total weight of the composition. Said in another way, in certain embodiments, the composition comprises from 5 wt %, or 10 wt %, or 15 wt %, or 20 wt % to 21 wt %, or 23 wt %, or 25 wt %, or 30 wt %, or 35 wt % a polyolefin elastomer, based on the total weight of the composition.

In certain embodiments, the polyolefin elastomer of the present composition is a polyolefin elastomer or a mixture of polyolefin elastomers. A "polyolefin elastomer" is an elastomeric polymer containing at least 50 mole percent (mol %) of units derived from one or more α-olefins (based on the total amount of polymerizable monomers), or that contains equal to or greater than 50 wt %, or a majority amount of, polymerized α-olefin monomer (based on the total weight of the elastomer). In various embodiments, the polyolefin elastomers consist of only polymerized α-olefin monomer, including ethylene. Such polyolefin elastomers can be either homopolymers or interpolymers. Examples of polyolefin homopolymers are homopolymers of ethylene or propylene. Examples of polyolefin interpolymers are ethylene/α-olefin interpolymers and propylene/α-olefin interpolymers. In such embodiments, the α-olefin can be a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Illustrative polyolefin copolymers include ethylene/propylene, ethylene/butene, ethylene/1-hexene, ethylene/1-octene, and the like. Illustrative terpolymers include ethylene/propylene/1-octene, ethylene/propylene/butene, and ethylene/butene/1-octene. In an embodiment, the polyolefin elastomer is an ethylene/octene copolymer. Additionally, the copolymers can be random or blocky.

Polyolefin elastomers can also comprise one or more functional groups such as an unsaturated ester or acid or silane, and these elastomers (polyolefins) are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids. One example of an unsaturated silane is vinyl trialkoxysilane.

Functional groups can also be included in the polyolefin elastomer through grafting which can be accomplished as is commonly known in the art. In one embodiment, grafting may occur by way of free radical functionalization which typically includes melt blending the polyolefin elastomer, a free radical initiator (such as a peroxide or the like), and a compound containing a functional group. During melt blending, the free radical initiator reacts (reactive melt blending) with the polyolefin elastomer to form polymer radicals. The compound containing a functional group bonds to the backbone of the polymer radicals to form a functionalized polymer. Exemplary compounds containing functional groups include but are not limited to alkoxysilanes (e.g., vinyl trimethoxysilane, vinyl triethoxysilane) and vinyl carboxylic acids and anhydrides (e.g., maleic anhydride).

Commercial examples of polyolefin elastomers useful herein include very-low-density polyethylene (VLDPE) (e.g., FLEXOMER™ ethylene/1-hexene polyethylene made by The Dow Chemical Company); homogeneously branched, linear ethylene/α-olefin copolymers (e.g. TAFMER™ by Mitsui Petrochemicals Company Limited and EXACT™ by Exxon Chemical Company); homogeneously branched, substantially linear ethylene/α-olefin copolymers (e.g., AFFINITY™ and ENGAGE™ available from The Dow Chemical Company); amorphous polyolefins (APOs) (e.g., EASTOFLEX™ amorphous propylene homopolymer available from Eastman Chemical Company); olefin block copolymers (e.g., INFUSE™ and INTUNE™ olefin block copolymers available from The Dow Chemical Company); and combinations thereof. In various embodiments, the polyolefin elastomers are the homogeneously branched linear and substantially linear ethylene/α-olefin copolymers. The substantially linear ethylene copolymers are more fully described in U.S. Pat. Nos. 5,272,236; 5,278,272 and 5,986,028. In another embodiment, the polyolefin elastomers are amorphous polyolefins, such as those more fully described in US Pub. No. 2004/0081795.

The polyolefin elastomers useful herein also include propylene-, butene-, and other alkene-based copolymers. Such copolymers comprise a majority (i.e., greater than 50 weight percent (wt %)) of units derived from the alkene (e.g., propylene) and a minority of units derived from another α-olefin (including ethylene). In an embodiment, the polyolefin elastomer includes a propylene-based copolymer. In further embodiments, the polyolefin elastomer comprises a propylene-ethylene copolymer. Exemplary propylene-based copolymers useful herein include VERSIFY™ polymers available from The Dow Chemical Company, and VISTAMAXX™ polymers available from ExxonMobil Chemical Company. When the component (B) polyolefin elastomer includes a polypropylene, it is different than the component (A) polypropylene.

Polyolefin elastomers can also include ethylene/propylene/diene monomer (EPDM) terpolymer elastomers and chlorinated polyethylenes (CPE). Commercial examples of suitable EPDMs include NORDEL™ EPDMs, available from The Dow Chemical Company. Commercial examples of suitable CPEs include TYRIN™ CPEs, available from The Dow Chemical Company.

In one or more embodiments, the polyolefin elastomer is selected from the group consisting of ethylene-based polyolefin elastomers, propylene-based polyolefin elastomers, and combinations thereof. In such embodiments, the ethylene-based polyolefin elastomer can have an ethylene content of greater than 50 wt %, or greater than 60 wt %, based on the entire weight of the ethylene-based polyolefin elastomer, with the balance consisting of one or more alpha-olefin monomers. Additionally, the ethylene-based polyolefin elastomer can have an ethylene content ranging from greater than 50 wt %, or 60 wt % to 75 wt %, or 90 wt %, based on the entire weight of the ethylene-based polyolefin elastomer, with the balance consisting of one or more alpha-olefin monomers. In various embodiments, the alpha-olefin monomer is octene.

Furthermore, when the polyolefin elastomer is propylene-based, it can have a propylene content of greater than 50 wt %, greater than 70 wt %, or greater than 90 wt %, based on the entire weight of the propylene-based polyolefin elastomer, with the balance consisting of one or more alpha-olefin monomers (including ethylene). Additionally, the propylene-based polyolefin elastomer can have a propylene content ranging from greater than 50 wt %, or 70 wt %, or 90 wt % to 97 wt %, or 98 wt %, or 99 wt %, based on the entire weight of the propylene-based polyolefin elastomer, with the balance consisting of one or more alpha-olefin monomers (including ethylene). In various embodiments, when the polyolefin elastomer is propylene-based, the alpha-olefin comonomer is ethylene. Nonlimiting examples of a suitable propylene-based polyolefin elastomer include propylene copolymer and propylene homopolymer. When the component (B) polyolefin elastomer includes a polypropylene, it is different than the component (A) polypropylene.

In one or more embodiments, the polyolefin elastomer includes an ethylene/octene copolymer.

Polyolefin elastomers suitable for use herein can have a density, in accordance with ASTM D792, from 0.850 g/cm$^3$ to 0.930 g/cm$^3$ (e.g., from 0.850 g/cm$^3$ to 0.920 g/cm$^3$, from 0.850 g/cm$^3$ to 0.910 g/cm$^3$, from 0.850 g/cm$^3$ to 0.900 g/cm$^3$, from 0.850 g/cm$^3$ to 0.890 g/cm$^3$, from 0.860 g/cm$^3$ to 0.880 g/cm$^3$, from 0.865 g/cm$^3$ to 0.875 g/cm$^3$, etc.). Said in another way, in various embodiments, a polyolefin elastomer suitable for use herein has a density from 0.850 g/cm$^3$, or 0.860 g/cm$^3$, or 0.865 g/cm$^3$ to 0.875 g/cm$^3$, or 0.880 g/cm$^3$, or 0.890 g/cm$^3$, or 0.900 g/cm$^3$, or 0.910 g/cm$^3$, or 0.920 g/cm$^3$, or 0.930 g/cm$^3$ in accordance with ASTM D792.

Polyolefin elastomers suitable for use herein can have a melt index from 0.1 g/10 min to 50 g/10 min (e.g., from 0.1 g/10 min to 40 g/10 min, from 0.1 g/10 min to 30 g/10 min, from 0.1 g/10 min to 20 g/10 min, from 0.1 g/10 min to 15 g/10 min, from 0.5 g/10 min to 10 g/10 min, from 0.5 g/10 min to 8 g/10 min, from 1 g/10 min to 8 g/10 min, from 2 g/10 min to 8 g/10 min, from 3 g/10 min to 7 g/10 min, from 4 g/10 min to 6 g/10 min, etc.) in accordance with ASTM D1238 (190° C./2.16 kg). Said in another way, in certain embodiments, polyolefin elastomers suitable for use herein can have a melt index from 0.1 g/10 min, or 0.5 g/10 min, or 1 g/10 min, or 2 g/10 min, or 3 g/10 min, or 4 g/10 min to 5 g/10 min, or 6 g/10 min, or 8 g/10 min, or 10 g/10 min, or 15 g/10 min, or 20 g/10 min, or 30 g/10 min, or 40 g/10 min, or 50 g/10 min in accordance with ASTM D1238 (190° C./2.16 kg).

Polyolefin elastomers suitable for use herein can have one or both of the following properties:

(a) a density from 0.850 g/cm$^3$, or 0.860 g/cm$^3$, or 0.865 g/cm$^3$, or 0.870 g/cm$^3$ to 0.880 g/cm$^3$, or 0.890 g/cm$^3$, or 0.900 g/cm$^3$, or 0.905 g/cm$^3$, or 0.910 g/cm$^3$, or 0.920 g/cm$^3$, or less than 0.930 g/cm$^3$ in accordance with ASTM D792; and/or (b) a melt index from 0.1 g/10 min, or 0.5 g/10 min, or 1 g/10 min, or 2 g/10 min, or 3 g/10 min, or 4 g/10 min to 5 g/10 min, or 6 g/10 min, or 8 g/10 min, or 10 g/10 min, or 15 g/10 min, or 20 g/10 min, or 30 g/10 min, or 40 g/10 min, or 50 g/10 min in accordance with ASTM D1238 (190° C./2.16 kg).

In one or more embodiments, the polyolefin elastomer includes an ethylene/octene copolymer with a density of 0.870 g/cm$^3$ (ASTM D792) and a melt index of 5 g/10 min (ASTM D1238, 190° C./2.16 kg).

The polyolefin elastomer may comprise one or more embodiments disclosed herein.

(C) Polyacetoacetate Compound

The present composition comprises a polyacetoacetate compound having the Formula (I). In an embodiment, the composition comprises from 0.01 wt % to 10 wt % (e.g., from 0.01 wt % to 8 wt %, from 0.05 wt % to 6 wt %, from 0.1 wt % to 5 wt %, from 0.1 wt % to 3 wt %, from 0.1 wt % to 2 wt %, from 0.1 wt % to 1 wt %, from 0.1 wt % to 0.5 wt %, from 0.15 to 0.45, etc.) of the polyacetoacetate compound, based on the total weight of the composition. Said in another way, in certain embodiments, the composition includes from 0.01 wt %, or 0.05 wt %, or 0.1 wt %, or 0.15 wt % to 0.45 wt %, or 0.5 wt %, or 1 wt %, or 2 wt %, or 3 wt %, or 5 wt %, or 6 wt %, or 8 wt %, or 10 wt % of a polyacetoacetate compound having the Formula (I), based on the total weight of the composition.

Polyacetoacetate compounds are known, for example, see JP 200506754 and JP 2005179423 and US Publication No. 2016/0304686, which is incorporated by reference herein in its entirety. As defined herein, a polyacetoacetate compound is a compound containing two or more acetoacetate (—O—C(O)CH$_2$C(O)—) groups. Suitable polyacetoacetate are described by the following structure of Formula (I):

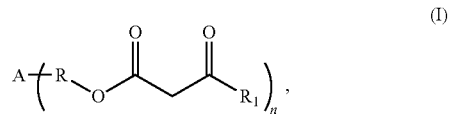

wherein

A is a polymer backbone, a $C_1$-$C_{30}$ substituted or unsubstituted linear or branched alkyl, aryl, arylalkyl, or alkaryl group wherein the substituents may be one or more O, N, S, halogen, or phosphine;

R is a bond or a $C_1$-$C_{30}$ linear or branched alkyl, aryl, arylalkyl, or alkaryl group;

$R_1$ is a substituted or unsubstituted $C_1$-$C_6$ alkyl or a substituted or unsubstituted aryl group; and n is 2 to 100.

In certain embodiments, R is a $C_1$ alkyl group or a substituted or unsubstituted ether moiety. In certain embodiments, $R_1$ is a $C_1$ or $C_2$ alkyl group. In certain embodiments, n is 2 to 20, 2 to 10, or 2 to 4.

Suitable polyacetoacetates according to the present disclosure are 2-ethyl-2-(((3-oxobutanoyl)oxy)methyl)propane-1,3-diyl bis(3-oxobutanoate) (i.e., trimethylolpropane triacetoacetate or "AATMP") and its isomers, 2,2-bis(((3-oxobutanoyl)oxy)methyl)propane-1,3-diyl bis(3-oxobutanoate) and its isomers, 2-(((3-oxobutanoyl)oxy)methyl) propane-1,3-diyl bis(3-oxobutanoate) and its isomers, 2-methyl-2-(((3-oxobutanoyl)oxy)methyl)propane-1,3-diyl bis(3-oxobutanoate) and its isomers, 1,2-diethylol diacetoacetate and its isomers, any homologs of acetoacetate polypropylene glycol or polyethylene glycol wherein the acetoacetated polypropylene glycol or polyethylene glycol can be linear or branched, acetoacetated branched polyether polyol or polyester polyol, hexane-1,2,3,4,5,6-hexayl hexakis(3-oxobutanoate) and its isomers, propane-1,2,3-triyl tris (3-oxobutanoate) and its isomers, or mixtures thereof.

Preferable polyacetoacetate compounds include, but are not limited to the following:

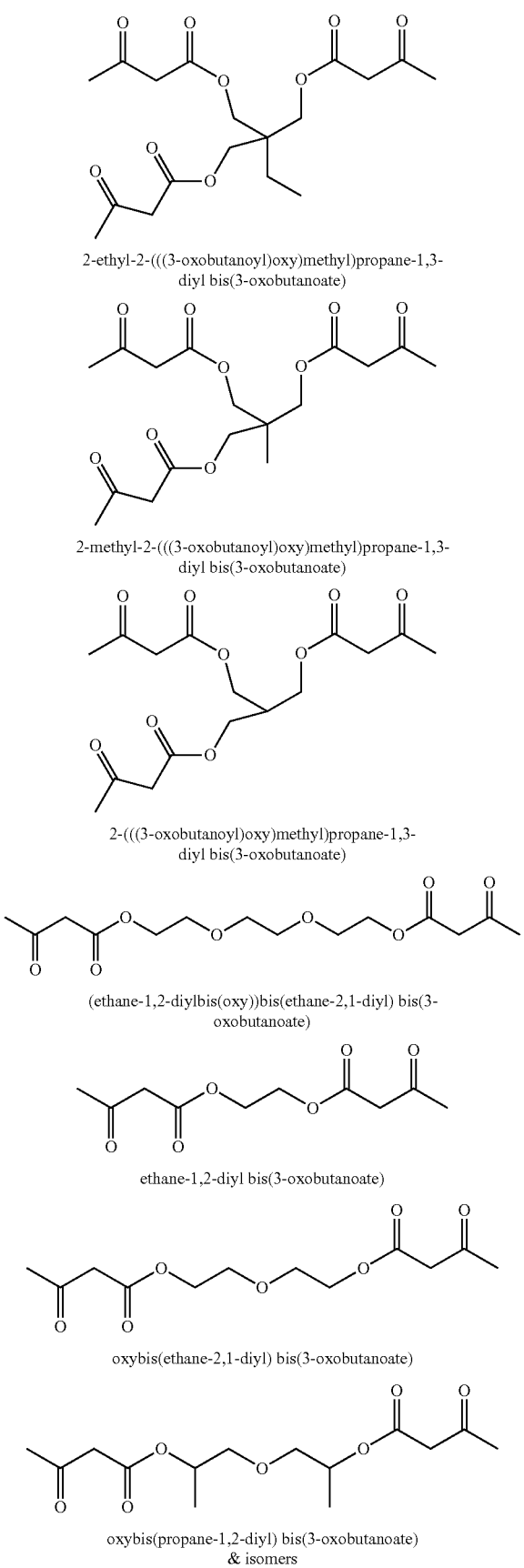
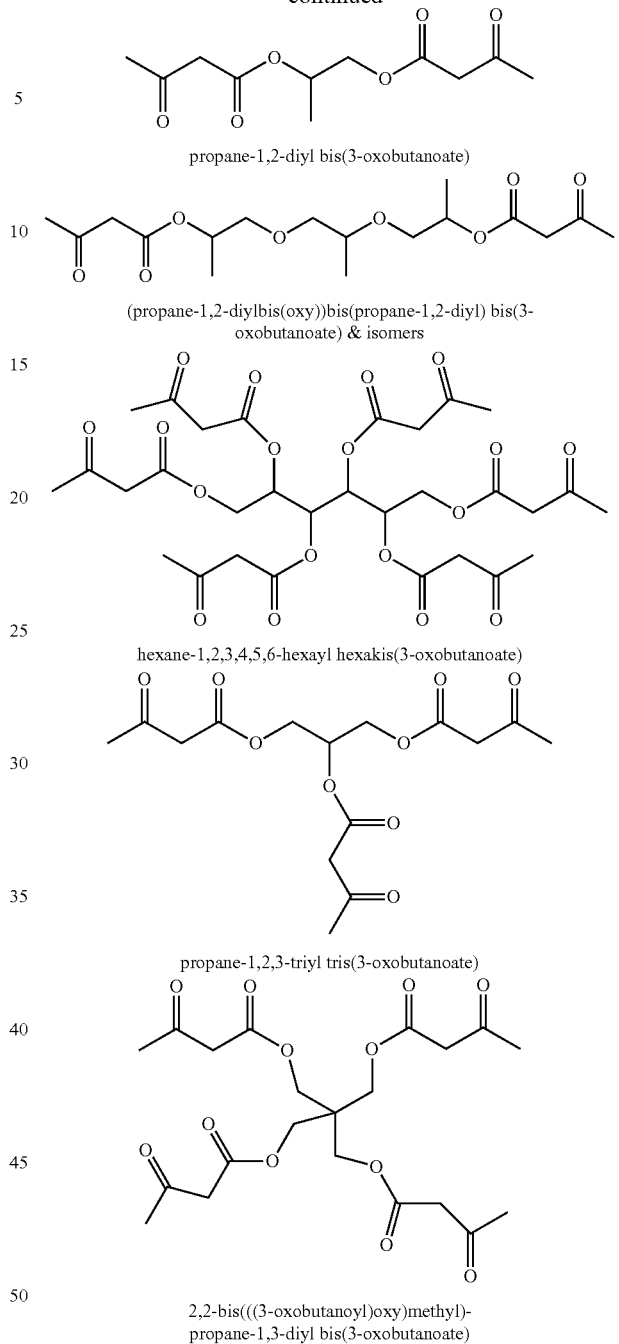

In certain embodiments, the polyacetoacetate compound of the present composition is 2-ethyl-2-(((3-oxobutanoyl)oxy)methyl)propane-1,3-diyl bis(3-oxobutanoate) (i.e., trimethylolpropane triacetoacetate or "AATMP").

The polyacetoacetate compound may comprise one or more embodiments disclosed herein.

(D) Additive Component

In certain embodiments, the present composition may comprise an additive component, which includes one or more optional additives. In certain embodiments, the present composition comprises from 0 wt % to 30 wt % (e.g., from 5 wt % to 25 wt %, from 10 wt % to 20 wt %, from 12 wt % to 18 wt %, from 15 wt % to 18 wt %, and/or from 16 wt % to 17 wt %) of an additive component, based on the total weight of the composition. Said in another way, in certain embodiments, the present composition comprises from 0 wt %, or 5 wt %, or 10 wt %, or 12 wt %, or 15 wt %, or 16 wt % to 17 wt %, or 18 wt %, or 20 wt %, or 25 wt %, or 30 wt % of an additive component, based on the total weight of the composition.

Conventional additives, which can be introduced into the composition, are exemplified by talc, antioxidants, mineral oil, pigments, processing aids, flame retardants, ultraviolet (UV) stabilizers, reinforcing filler, calcium carbonate, mica, glass fibers, whisker, anti-scratch additives, and combinations thereof.

In an embodiment, the composition includes talc, such as JetFil™ 700, available from IMERYS. Talc is typically used in amounts of from 0 wt %, or 1 wt %, or 5 wt %, or 10 wt %, or 15 wt %, or 16 wt % to 17 wt %, 18 wt %, or 20 wt %, or 25 wt %, or 30 wt %, based on the total weight of the composition.

Nonlimiting examples of suitable antioxidant includes tris(2,4-ditert-butylphenyl)phosphite, pentaerythritol tetrakis[3-[3,5-di-tert-butyl-4-hydroxyphenyl]propionate], and combinations thereof. In an embodiment, the composition contains an antioxidant such as IRGANOX™ B 225, which contains a blend of 50 wt % tris(2,4-ditert-butylphenyl) phosphite and 50 wt % pentaerythritol tetrakis[3-[3,5-di-tert-butyl-4-hydroxyphenyl]propionate]. Antioxidant is typically used in amounts of from 0 wt %, or 0.05 wt %, or 0.1 wt %, or 0.2 wt % to 0.3 wt %, or 0.5 wt %, or 1 wt %, or 2 wt %, based on the total weight of the composition.

In an embodiment, the composition includes a processing aid. Nonlimiting examples of suitable processing aids include calcium stearate. Processing aids are typically used in amounts of from 0 wt %, or 0.05 wt %, or 0.1 wt % to 0.5 wt %, or 1 wt %, or 2 wt %, based on the total weight of the composition.

In an embodiment, the composition includes an ultraviolet (UV) stabilizer. Nonlimiting examples of suitable ultraviolet (UV) stabilizer include hindered amine light stabilizer (HALS) such as bis(2,2,6,6-tetramethyl-4-piperidyl)sebaceate (commercially available as Tinuvin™ 770 from BASF) and poly[[6-[(1,1,3,3-tetramethylbutyl)amino]-1,3,5-triazine-2,4-diyl][(2,2,6,6-tetramethyl-4-piperidinyl) imino]-1,6-hexanediyl][(2,2,6,6-tetramethyl-4-piperidinyl) imino]] (commercially available as Chimassorb™ 944 from BASF). UV stabilizers are typically used in amounts of from 0.05 wt %, or 0.1 wt %, or 0.5 wt % to 1 wt %, or 2 wt %, based on the total weight of the composition.

In an embodiment, the composition includes a reinforcing filler. Nonlimiting examples of reinforcing filler include glass fiber, mica, whisker, calcium carbonate ($CaCO_3$), and combinations thereof. Reinforcing filler is typically used in amounts of from 2 wt %, or 5 wt % to 10 wt %, or 15 wt %, or 20 wt %, based on the total weight of the composition.

In an embodiment, the composition includes talc and an antioxidant.

In an embodiment, the composition includes from 0 wt %, or greater than 0 wt %, or 1 wt %, or 5 wt %, or 10 wt %, or 15 wt %, or 16 wt % to 17 wt %, or 20 wt %, or 25 wt %, or 30 wt % total additives, based on the total weight of the composition.

The additive may comprise one or more embodiments disclosed herein.

(E) Compatibilizer

In certain embodiments, the present composition may optionally include a compatibilizer. In certain embodiments, the present composition comprises from 0 wt % to 10 wt % of a compatibilizer, based on the total weight of the composition. In certain embodiments, the present composition comprises from 0 wt %, or 0.01 wt %, or 0.05 wt %, or 0.1 wt %, or 0.2 wt %, or 0.3 wt %, or 0.4 wt %, or 0.5 wt %, or 0.6 wt % to 0.8 wt %, or 1.0 wt %, or 1.5 wt %, or 2.0 wt %, or 3.0 wt %, or 4.0 wt %, or 5.0 wt %, or 8.0 wt %, or 10 wt % of the compatibilizer, based on the total weight of the composition.

In certain embodiments, the compatibilizer improves the compatibility between the (B) polyolefin elastomer and the (C) polyacetoacetate compound.

The compatibilizer may be a styrenic block copolymer, an ethylene acrylic acid (EAA) copolymer, an ethylene ethyl acrylate (EEA) copolymer, a block composite, a specified block composite, a crystalline block composite, or combinations thereof.

In various embodiments, the compatibilizer is a styrenic block copolymer. The styrenic block copolymer may be any styrenic block copolymer disclosed herein. In an embodiment, the styrenic block copolymer is SEBS.

Styrenic block copolymer suitable for use herein can have, in accordance with D792, a density from 0.850 g/cm$^3$, or 0.860 g/cm$^3$, or 0.870 g/cm$^3$, or 0.880 g/cm$^3$ to 0.885 g/cm$^3$, or 0.890 g/cm$^3$, or 0.900 g/cm$^3$.

Styrenic block copolymer suitable for use herein can have, in accordance with D1238 (230° C./5.00 kg), a melt flow rate from 5 g/10 min, or 10 g/10 min, or 15 g/10 min, or 20 g/10 min to 25 g/10 min, or 30 g/10 min, or 40 g/10 min, or 50 g/10 min.

Styrenic block copolymer suitable for use herein can have one or both of the following properties:

(a) a density from 0.850 g/cm$^3$, or 0.860 g/cm$^3$, or 0.870 g/cm$^3$, or 0.880 g/cm$^3$ to 0.885 g/cm$^3$, or 0.890 g/cm$^3$, or 0.900 g/cm$^3$; and/or (b) a melt flow rate from 5 g/10 min, or 10 g/10 min, or 15 g/10 min, or 20 g/10 min to 25 g/10 min, or 30 g/10 min, or 40 g/10 min, or 50 g/10 min (230° C./5.00 kg).

In one or more embodiments, the compatibilizer is a styrenic block copolymer that is SEBS having a density of 0.880 g/cm$^3$ and a melt flow rate of 22 g/10 min (230° C./5.00 kg).

In various embodiments, the compatibilizer is an ethylene acrylic acid (EAA) copolymer. The EEA copolymer may contain from 1 wt %, or 5 wt %, or 10 wt %, or 12 wt %, or 15 wt %, or 18 wt % to 19 wt %, or 20 wt %, or 25 wt %, or 30 wt %, or 40 wt %, or less than 50 wt % polymerized ethyl acrylate, based on the total weight of the EEA copolymer. EEA copolymer suitable for use herein can have, in accordance with ASTM D792, a density from 0.920 g/cm$^3$, or 0.925 g/cm$^3$, or 0.930 g/cm$^3$ to 0.935 g/cm$^3$, or 0.940 g/cm$^3$, or 0.945 g/cm$^3$. EEA copolymer suitable for use herein can have, in accordance with ASTM D1238 (190° C./2.16 kg), a melt index from 0.5 g/10 min, or 1 g/10 min, or 2 g/10 min, or 5 g/10 min to 6 g/10 min, or 8 g/10 min, or 10 g/10 min, or 15 g/10 min, or 20 g/10 min.

In one or more embodiments, the compatibilizer is an EEA copolymer containing 18.5 wt % polymerized ethyl acrylate, based on the total weight of the EEA copolymer, that has a density of 0.931 g/cm$^3$ (ASTM D792) and a melt index of 6.0 g/10 min (ASTM D1238, 190° C./2.16 kg).

In an embodiment, the compatibilizer is a block composite. "Block composite" refers to polymers comprising an ethylene based polymer (EP) (soft copolymer) having an ethylene content of from 10 mol % to 90 mol %, an alpha-olefin based polymer (AOP) (hard copolymer) having an alpha-olefin content of greater than 90 mol %, and a block copolymer (diblock) having an ethylene block/segment (EB) and an alpha-olefin block/segment (AOB), wherein the ethylene block of the block copolymer is the same composition as the ethylene based polymer of the block composite and the alpha-olefin block of the block copolymer is the same composition as the alpha-olefin based polymer of the block composite. The compositional split between the amount of ethylene based polymer and alpha-olefin based polymer will be essentially the same as that between the corresponding blocks in the block copolymer. The block composite of the present disclosure is similar to those disclosed in U.S. Pat. Nos. 8,053,529; 8,686,087; and 8,716,400, which are incorporated herein by reference.

In an embodiment, the compatibilizer is a specified block composite. "Specified block composite" refers to polymers comprising an ethylene based polymer (EP) (soft copolymer) having an ethylene content of from 78 mol % to 90 mol %, an alpha-olefin based polymer (AOP) (hard copolymer) having an alpha-olefin content of from 61 mol % to 90 mol %, and a block copolymer (diblock) having an ethylene block/segment (EB) and an alpha-olefin block/segment (AOB), wherein the ethylene block of the block copolymer is the same composition as the ethylene based polymer of the specified block composite and the alpha-olefin block of the block copolymer is the same composition as the alpha-olefin based polymer of the specified block composite. The compositional split between the amount of ethylene based polymer and alpha-olefin based polymer will be essentially the same as that between the corresponding blocks in the block copolymer. The specified block composite of the present disclosure is similar to those disclosed in WO 2017/044547, which is incorporated herein by reference.

In an embodiment, the compatibilizer is a crystalline block composite. "Crystalline block composite" refers to polymers comprising a crystalline ethylene based polymer (CEP) having an ethylene content of greater than 90 mol %, a crystalline alpha-olefin based polymer (CAOP) having an alpha-olefin content of greater than 90 mol %, and a block copolymer (diblock) having a crystalline ethylene block (CEB) and a crystalline alpha-olefin block (CAOB), wherein the CEB of the block copolymer is the same composition as the CEP of the crystalline block composite and the CAOB of the block copolymer is the same composition as the CAOP of the crystalline block composite. The compositional split between the amount of CEP and CAOP will be essentially the same as that between the corresponding blocks in the block copolymer. The crystalline block composite of the present disclosure is similar to those disclosed in WO 2016/0028961 A1, which is incorporated herein by reference.

The compatibilizer may comprise one or more embodiments disclosed herein.

Composition

The present disclosure provides a composition, and further a thermoplastic polyolefin (POE) composition comprising:
 (A) a polypropylene polymer;
 (B) a polyolefin elastomer;
 (C) a polyacetoacetate compound;
 (D) an optional additive component; and
 (E) an optional compatibilizer,
wherein the polyacetoacetate compound has the Formula (I):

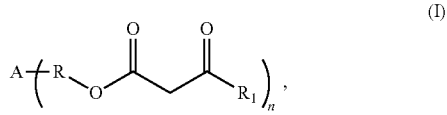

wherein
 A is a polymer backbone, a $C_1$-$C_{30}$ substituted or unsubstituted linear or branched alkyl, aryl, arylalkyl, or alkaryl group, wherein the substituents may be one or more O, N, S, halogen, or phosphine;
 R is a bond or a $C_1$-$C_{30}$ linear or branched alkyl, aryl, arylalkyl, or alkaryl group;
 $R_1$ is a substituted or unsubstituted $C_1$-$C_6$ alkyl or a substituted or unsubstituted aryl group; and
 n is 2 to 100.

In certain embodiments, the present disclosure provides a composition comprising:
 (A) from 50 wt % to 85 wt % of a polypropylene polymer;
 (B) from 5 wt % to 35 wt % a polyolefin elastomer;
 (C) from 0.01 wt % to 10 wt % of a polyacetoacetate compound having the Formula (I);
 (D) optionally, from 0 wt % to 30 wt % of an additive component; and
 (E) optionally, from 0 wt % to 10 wt % of a compatibilizer.

In certain embodiments, the composition includes:
 (A) from 50 wt %, or 55 wt %, or 60 wt %, or 61 wt %, or 62 wt % to 63 wt %, or 64 wt %, or 65 wt %, or 70 wt %, or 75 wt %, or 80 wt %, or 85 wt % of a polypropylene impact copolymer;
 (B) from 5 wt %, or 10 wt %, or 15 wt %, or 20 wt % to 21 wt %, or 23 wt %, or 25 wt %, or 30 wt %, or 35 wt % of an ethylene/octene copolymer;
 (C) from 0.01 wt %, or 0.05 wt %, or 0.1 wt %, or 0.15 wt % to 0.45 wt %, or 0.5 wt %, or 1 wt %, or 2 wt %, or 3 wt %, or 5 wt %, or 6 wt %, or 8 wt %, or 10 wt % of a polyacetoacetate compound having the Formula (I);
 (D) from 0 wt %, or 5 wt %, or 10 wt %, or 12 wt %, or 15 wt %, or 16 wt % to 17 wt %, or 18 wt %, or 20 wt %, or 25 wt %, or 30 wt % of an additive component selected from talc, antioxidant, processing aid, reinforcing filler, and combinations thereof; and
 (E) from 0 wt %, or 0.01 wt %, or 0.05 wt %, or 0.1 wt %, or 0.2 wt %, or 0.3 wt %, or 0.4 wt %, or 0.5 wt %, or 0.6 wt % to 0.8 wt %, or 1.0 wt %, or 1.5 wt %, or 2.0 wt %, or 2.5 wt %, or 3.0 wt %, or 3.5 wt %, or 4.0 wt %, or 5.0 wt %, or 8.0 wt %, or 10 wt % of a compatibilizer selected from SEBS, EEA copolymer, EAA copolymer, or combinations thereof.

It is understood that the sum of the components in each of the foregoing compositions yields 100 weight percent.

In certain embodiments, the present composition includes at least four different components: (A) a polypropylene polymer, (B) a polyolefin elastomer, (C) a polyacetoacetate compound, and (D) an additive component. Thus, one component cannot serve as two components. For example, when each of the (A) polypropylene and (B) polyolefin elastomer are polypropylene, they are different polypropylenes (e.g., a polypropylene impact copolymer and a polypropylene homopolymer).

The present composition advantageously causes aldehyde abatement (i.e., reduction). Aldehydes can be dangerous to the health of humans and/or animals. Aldehydes can also be harmful to the environment. Nonlimiting examples of aldehydes include formaldehyde, acetaldehyde, acrolein, propionaldehyde, and crotonaldehyde.

In various embodiments, the present composition contains less than 0.01 mg/m$^3$ formaldehyde, as measured in accordance with the VOC Test Method described below in the Test Methods section. In certain embodiments, the present composition contains from 0 mg/m$^3$ to less than 0.01 mg/m$^3$, or less than 0.02 mg/m$^3$, or less than 0.03 mg/m$^3$, or less than 0.05 mg/m³, or less than 0.10 mg/m³, or less than 0.20 mg/m³, or less than 0.21 mg/m³ formaldehyde, as measured in accordance with the VOC Test Method.

In various embodiments, the present composition contains less than 0.10 mg/m³ acetaldehyde, as measured in accordance with the VOC Test Method. In certain embodiments, the present composition contains from 0 mg/m³ to less than 0.01 mg/m³, or less than 0.05 mg/m³, or less than or equal to 0.09 mg/m³, or less than 0.10 mg/m³, or less than 0.30 mg/m³, or less than 0.50 mg/m³, or less than 0.90 mg/m³, or less than 1.00 mg/m³, or less than 1.30 mg/m³, or less than 1.35 mg/m³, or less than 1.39 mg/m³ acetaldehyde, as measured in accordance with the VOC Test Method.

In various embodiments, the present composition contains less than 0.01 mg/m³ acrolein, as measured in accordance with the VOC Test Method. In certain embodiments, the present composition contains from 0 mg/m³ to less than 0.01 mg/m³, or less than 0.02 mg/m³, or less than 0.03 mg/m³, or less than 0.05 mg/m³ acrolein, as measured in accordance with the VOC Test Method.

In various embodiments, the present composition contains less than or equal to 0.10 mg/m³ propionaldehyde, as measured in accordance with the VOC Test Method. In certain embodiments, the present composition contains from 0 mg/m³ to less than 0.01 mg/m³, or less than 0.05 mg/m³, or less than or equal to 0.10 mg/m³, or less than 0.15 mg/m³, or less than 0.17 mg/m³ propionaldehyde, as measured in accordance with the VOC Test Method.

In various embodiments, the present composition contains less than 0.01 mg/m³ crotonaldehyde, as measured in accordance with the VOC Test Method. In certain embodiments, the present composition contains from 0 mg/m³ to less than 0.01 mg/m³, or less than 0.02 mg/m³, or less than 0.03 mg/m³, or less than 0.05 mg/m³ crotonaldehyde, as measured in accordance with the VOC Test Method.

In certain embodiments, the present composition has a flexural modulus (Young's modulus) from 1200 MPa, or 1400 MPa, or 1500 MPa, or 1600 MPa, or 1700 MPa to 1800 MPa, or 1900 MPa, or 2000 MPa, as measured in accordance with ISO 178. In various embodiments, the present composition has a flexural modulus (Young's modulus) of greater than 1700 MPa, as measured in accordance with ISO 178.

In various embodiments, the present composition has a flexural yield strength from 20 MPa, or 25 MPa, or 30 MPa, or 31 MPa to 35 MPa, or 40 MPa, or 50 MPa, as measured in accordance with ISO 178. In various embodiments, the present composition has a flexural yield strength of greater than 30 MPa, as measured in accordance with ISO 178.

In various embodiments, the present composition has a tensile modulus from 1000 MPa, or 1200 MPa, or 1300 MPa, or 1400 Mpa, or 1500 MPa, or 1600 MPa, or 1700 MPa to 1800 MPa, or 1900 MPa, or 2000 MPa, as measured in accordance with ISO 527. In various embodiments, the present composition has a tensile modulus of greater than 1700 MPa, as measured in accordance with ISO 527.

In various embodiments, the present composition has a tensile yield strength from 10 MPa, or 15 MPa, or 18 MPa, or 20 MPa, or 21 MPa to 25 MPa, or 30 MPa, or 35 MPa, as measured in accordance with ISO 527. In various embodiments, the present composition has a tensile yield strength of greater than 20 MPa, as measured in accordance with ISO 527.

In various embodiments, the present composition has an impact strength (Notched IZOD) at 23° C. from 15 kJ/m², or 20 kJ/m², or 25 kJ/m², or 30 kJ/m², or 31 kJ/m² to 33 kJ/m², or 35 kJ/m², or 40 kJ/m², or 45 kJ/m², or 50 kJ/m², as measured in accordance with ISO 180. In various embodiments, the present composition has an impact strength (Notched IZOD) at 23° C. of greater than 31 kJ/m², as measured in accordance with ISO 180.

In various embodiments, the present composition has an impact strength (Notched IZOD) at −30° C. from 2 kJ/m², or 3.5 kJ/m², or 4.0 kJ/m² to 5.0 kJ/m², or 6.0 kJ/m², or 8.0 kJ/m², as measured in accordance with ISO 180. In various embodiments, the present composition has an impact strength (Notched IZOD) at −30° C. of greater than 4.20 kJ/m², as measured in accordance with ISO 180.

In various embodiments, the composition contains less than 0.01 mg/m³ formaldehyde, less than 0.10 mg/m³ acetaldehyde, less than 0.01 mg/m³ acrolein, less than or equal to 0.10 mg/m³ propionaldehyde, and/or less than 0.01 mg/m³ crotonaldehyde, as measured in accordance with the VOC Test Method. In one or more embodiments, the present composition can have one, some, or all of the following properties:

(i) a flexural modulus from 1200 MPa, or 1400 MPa, or 1500 MPa, or 1600 MPa, or 1700 MPa to 1800 MPa, or 1900 MPa, or 2000 MPa, as measured in accordance with ISO 178;

(ii) a flexural yield strength from 20 MPa, or 25 MPa, or 30 MPa, or 31 MPa to 35 MPa, or 40 MPa, or 50 MPa, as measured in accordance with ISO 178;

(iii) a tensile modulus from 1000 MPa, or 1200 MPa, or 1300 MPa, or 1400 Mpa, or 1500 MPa, or 1600 MPa, or 1700 MPa to 1800 MPa, or 1900 MPa, or 2000 MPa, as measured in accordance with ISO 527;

(iv) a tensile yield strength from 10 MPa, or 15 MPa, or 18 MPa, or 20 MPa, or 21 MPa to 25 MPa, or 30 MPa, or 35 MPa, as measured in accordance with ISO 527;

(v) an impact strength (Notched IZOD) at 23° C. from 15 kJ/m², or 20 kJ/m², or 25 kJ/m², or 30 kJ/m², or 31 kJ/m² to 33 kJ/m², or 35 kJ/m², or 40 kJ/m², or 45 kJ/m², or 50 kJ/m², as measured in accordance with ISO 180; and/or (vi) an impact strength (Notched IZOD) at −30° C. from 2 kJ/m², or 3.5 kJ/m², or 4.0 kJ/m² to 5.0 kJ/m², or 6.0 kJ/m², or 8.0 kJ/m², as measured in accordance with ISO 180.

In various embodiments, the composition has at least two, or at least three, or at least four, or at least five, or all of properties (i)-(vi).

In various embodiments, the composition includes:

(A) from 50 wt %, or 55 wt %, or 60 wt %, or 61 wt %, or 62 wt % to 63 wt %, or 64 wt %, or 65 wt %, or 70 wt %, or 75 wt %, or 80 wt %, or 85 wt % of a polypropylene impact copolymer;

(B) from 5 wt %, or 10 wt %, or 15 wt %, or 20 wt % to 21 wt %, or 23 wt %, or 25 wt %, or 30 wt %, or 35 wt % of an ethylene/octene copolymer;

(C) from 0.01 wt %, or 0.05 wt %, or 0.1 wt %, or 0.15 wt % to 0.45 wt %, or 0.5 wt %, or 1 wt %, or 2 wt %, or 3 wt %, or 5 wt %, or 6 wt %, or 8 wt %, or 10 wt % of a polyacetoacetate compound having the Formula (I);

(D) from 0 wt %, or 5 wt %, or 10 wt %, or 12 wt %, or 15 wt %, or 16 wt % to 17 wt %, or 18 wt %, or 20 wt %, or 25 wt %, or 30 wt % of an additive component selected from talc, antioxidant, processing aid, reinforcing filler, and combinations thereof; and (E) from 0 wt %, or 0.01 wt %, or 0.05 wt %, or 0.1 wt %, or 0.2 wt %, or 0.3 wt %, or 0.4 wt %, or 0.5 wt %, or 0.6 wt % to 0.8 wt %, or 1.0 wt %, or 1.5 wt %, or 2.0 wt %, or 2.5 wt %, or 3.0 wt %, or 3.5 wt %, or 4.0 wt %, or 5.0 wt %, or 8.0 wt %, or 10 wt % of a compatibilizer selected from SEBS, EEA copolymer, EAA copolymer, or combinations thereof; and in one or more embodiments, the composition contains less than 0.01 mg/m³ formaldehyde, less than 0.10 mg/m³ acetaldehyde, less than 0.01 mg/m³ acrolein, less than or equal to 0.10 mg/m³ propionaldehyde, and/or less than 0.01 mg/m³ crotonaldehyde, as measured in accordance with the VOC Test Method; and in one or more embodiments, the present composition can have one, some, or all of the following properties:

(i) a flexural modulus from 1200 MPa, or 1400 MPa, or 1500 MPa, or 1600 MPa, or 1700 MPa to 1800 MPa, or 1900 MPa, or 2000 MPa, as measured in accordance with ISO 178;

(ii) a flexural yield strength from 20 MPa, or 25 MPa, or 30 MPa, or 31 MPa to 35 MPa, or 40 MPa, or 50 MPa, as measured in accordance with ISO 178;

(iii) a tensile modulus from 1000 MPa, or 1200 MPa, or 1300 MPa, or 1400 Mpa, or 1500 MPa, or 1600 MPa, or 1700 MPa to 1800 MPa, or 1900 MPa, or 2000 MPa, as measured in accordance with ISO 527;

(iv) a tensile yield strength from 10 MPa, or 15 MPa, or 18 MPa, or 20 MPa, or 21 MPa to 25 MPa, or 30 MPa, or 35 MPa, as measured in accordance with ISO 527;

(v) an impact strength (Notched IZOD) at 23° C. from 15 kJ/m², or 20 kJ/m², or 25 kJ/m², or 30 kJ/m², or 31 kJ/m² to 33 kJ/m², or 35 kJ/m², or 40 kJ/m², or 45 kJ/m², or 50 kJ/m², as measured in accordance with ISO 180; and/or (vi) an impact strength (Notched IZOD) at −30° C. from 2 kJ/m², or 3.5 kJ/m², or 4.0 kJ/m² to 5.0 kJ/m², or 6.0 kJ/m², or 8.0 kJ/m², as measured in accordance with ISO 180.

In various embodiments, the composition has at least two, or at least three, or at least four, or at least five, or all of properties (i)-(vi).

In an embodiment, the composition is non-aqueous. A "non-aqueous" composition excludes a solvent, such as water.

In an embodiment, the composition excludes divalent metal ions such as zinc, calcium, magnesium, and zirconium.

In various embodiments, the composition is in the form of a pellet. The pellet may have a diameter from 2.0 mm, or 2.3 mm to 3.0 mm, or 3.5 mm and a length from 2.0 mm, or 2.3 mm to 3.0 mm, or 3.5 mm. In an embodiment, the composition is in the form of a pellet with a diameter from 2.3 mm to 3.0 mm and a length from 2.3 mm to 3.0 mm.

The present composition may comprise one or more embodiments disclosed herein.

Article

The present disclosure provides an article made from a composition comprising:

(A) a polypropylene polymer;
(B) a polyolefin elastomer;
(C) a polyacetoacetate compound;
(D) an optional additive component; and
(E) an optional compatibilizer, wherein the polyacetoacetate compound has the Formula (I):

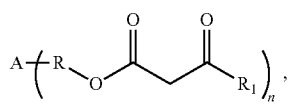

(I)

wherein

A is a polymer backbone, a $C_1$-$C_{30}$ substituted or unsubstituted linear or branched alkyl, aryl, arylalkyl, or alkaryl group, wherein the substituents may be one or more O, N, S, halogen, or phosphine;

R is a bond or a $C_1$-$C_{30}$ linear or branched alkyl, aryl, arylalkyl, or alkaryl group;

$R_1$ is a substituted or unsubstituted $C_1$-$C_6$ alkyl or a substituted or unsubstituted aryl group; and n is 2 to 100.

The composition may be any composition previously disclosed herein.

In various embodiments, the article is a molded article. The article may be formed by injection molding or compression molding.

The article may be in, but is not limited to, the form of an automobile interior part, such as an instrument panel, a door panel, or a seat.

In various embodiments, the article is made from a composition that contains less than 0.01 mg/m³ formaldehyde, as measured in accordance with the VOC Test Method described below in the Test Methods section. In certain embodiments, the article is made from a composition that contains from 0 mg/m³ to less than 0.01 mg/m³, or less than 0.02 mg/m³, or less than 0.03 mg/m³, or less than 0.05 mg/m³, or less than 0.10 mg/m³, or less than 0.20 mg/m³, or less than 0.21 mg/m³ formaldehyde, as measured in accordance with the VOC Test Method.

In various embodiments, the article is made from a composition that contains less than 0.10 mg/m³ acetaldehyde, as measured in accordance with the VOC Test Method. In certain embodiments, the article is made from a composition that contains from 0 mg/m³ to less than 0.01 mg/m³, or less than 0.05 mg/m³, or less than or equal to 0.09 mg/m³, or less than 0.10 mg/m³, or less than 0.30 mg/m³, or less than 0.50 mg/m³, or less than 0.90 mg/m³, or less than 1.00 mg/m³, or less than 1.30 mg/m³, or less than 1.35 mg/m³, or less than 1.39 mg/m³ acetaldehyde, as measured in accordance with the VOC Test Method.

In various embodiments, the article is made from a composition that contains less than 0.01 mg/m³ acrolein, as measured in accordance with the VOC Test Method. In certain embodiments, the article is made from a composition that contains from 0 mg/m³ to less than 0.01 mg/m³, or less than 0.02 mg/m³, or less than 0.03 mg/m³, or less than 0.05 mg/m³ acrolein, as measured in accordance with the VOC Test Method.

In various embodiments, the article is made from a composition that contains less than or equal to 0.10 mg/m³ propionaldehyde, as measured in accordance with the VOC Test Method. In certain embodiments, the article is made from a composition contains from 0 mg/m³ to less than 0.01 mg/m³, or less than 0.05 mg/m³, or less than or equal to 0.10 mg/m³, or less than 0.15 mg/m³, or less than 0.17 mg/m³ propionaldehyde, as measured in accordance with the VOC Test Method.

In various embodiments, the article is made from a composition that contains less than 0.01 mg/m³ crotonaldehyde, as measured in accordance with the VOC Test Method. In certain embodiments, the article is made from a composition that contains from 0 mg/m³ to less than 0.01 mg/m³, or less than 0.02 mg/m³, or less than 0.03 mg/m³, or less than 0.05 mg/m³ crotonaldehyde, as measured in accordance with the VOC Test Method.

In various embodiments, the article is made from a composition that contains less than 0.01 mg/m³ formaldehyde, less than 0.10 mg/m³ acetaldehyde, less than 0.01 mg/m³ acrolein, less than or equal to 0.10 mg/m³ propionaldehyde, and/or less than 0.01 mg/m³ crotonaldehyde, as measured in accordance with the VOC Test Method. In one or more embodiments, the article is made from a composition that can have one, some, or all of the following properties:

(i) a flexural modulus from 1200 MPa, or 1400 MPa, or 1500 MPa, or 1600 MPa, or 1700 MPa to 1800 MPa, or 1900 MPa, or 2000 MPa, as measured in accordance with ISO 178;

(ii) a flexural yield strength from 20 MPa, or 25 MPa, or 30 MPa, or 31 MPa to 35 MPa, or 40 MPa, or 50 MPa, as measured in accordance with ISO 178;

(iii) a tensile modulus from 1000 MPa, or 1200 MPa, or 1300 MPa, or 1400 Mpa, or 1500 MPa, or 1600 MPa, or 1700 MPa to 1800 MPa, or 1900 MPa, or 2000 MPa, as measured in accordance with ISO 527;

(iv) a tensile yield strength from 10 MPa, or 15 MPa, or 18 MPa, or 20 MPa, or 21 MPa to 25 MPa, or 30 MPa, or 35 MPa, as measured in accordance with ISO 527;

(v) an impact strength (Notched IZOD) at 23° C. from 15 kJ/m², or 20 kJ/m², or 25 kJ/m², or 30 kJ/m², or 31 kJ/m² to 33 kJ/m², or 35 kJ/m², or 40 kJ/m², or 45 kJ/m², or 50 kJ/m², as measured in accordance with ISO 180; and/or (vi) an impact strength (Notched IZOD) at −30° C. from 2 kJ/m², or 3.5 kJ/m², or 4.0 kJ/m² to 5.0 kJ/m², or 6.0 kJ/m², or 8.0 kJ/m², as measured in accordance with ISO 180.

In various embodiments, the article is made from a composition that has one, at least two, or at least three, or at least four, or at least five, or all of properties (i)-(vi).

The present article may comprise one or more embodiments disclosed herein.

The present compositions and articles advantageously contain a low concentration of aldehydes, such as formaldehyde, acetaldehyde, acrolein, propionaldehyde, and crotonaldehyde, while maintaining or improving upon the mechanical properties necessary for automobile interior parts. Not wishing to be bound by any particular theory, Applicants believe the methylene group(s) present in the polyacetoacetate compound reacts with aldehydes present in the composition, such as by a nucleophilic addition reaction, which reduces the aldehyde concentration. A non-limiting example of the nucleophilic addition reaction is depicted in Equation (1) below, which depicts the abatement of aldehyde by an exemplary polyacetoacetate compound.

Equation (1)

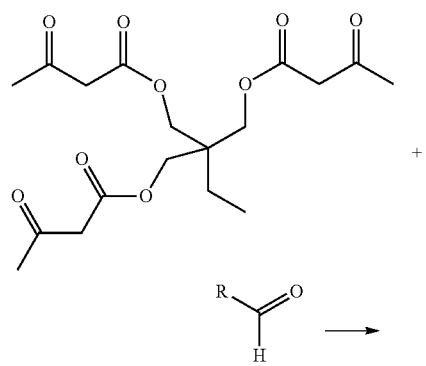

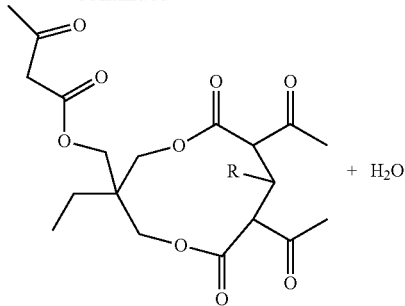

The polyacetoacetate compound comprising methylene group(s) reduces the aldehyde concentration of the composition, the article, and may reduce the aldehyde concentration of other automobile interior parts (such as when the methylene group(s) reacts with aldehydes present in the interior air of an automobile). Further, the present compositions and articles exhibit a balance between toughness (demonstrated by the tensile impact properties such as IZOD testing) and stiffness (demonstrated by the tensile and flexural properties) that is advantageous for automobile interior parts.

By way of example, and not limitation, examples of the present disclosure are provided.

EXAMPLES

1. Test Methods

Density is measured in accordance with ASTM D792, Method B. The result is recorded in grams (g) per cubic centimeter (g/cc or g/cm³).

Melt flow rate (MFR) for polypropylene is measured in accordance with ASTM D1238, Condition 230° C./2.16 kilogram (kg) weight. The result is recorded in grams (g) eluted per 10 minutes (g/10 min).

Melt flow rate (MFR) for styrenic polymer, including polystyrene and styrenic block copolymer, is measured in accordance with ASTM D1238, Condition 230° C./5.00 kilogram (kg) weight. The result is recorded in g/10 min.

Melt index (MI) is measured in accordance with ASTM D1238, Condition 190° C./2.16 kilogram (kg) weight, also known as $I_2$. The result is reported g/10 min.

Notched IZOD Impact Strength is measured in accordance with ISO 180 at room temperature (23° C.) and at −30° C. The result is recorded in kilojoules (kJ) per square meter (kJ/m²).

Flexural modulus (Young's Modulus) is measured in accordance with ISO 178. The result is recorded in megaPascal, or MPa.

Flexural yield strength is measured in accordance with ISO 178. The result is recorded in megaPascal, or MPa.

Tensile modulus is measured in accordance with ISO 527. The result is recorded in megaPascal, or MPa.

Tensile yield strength is measured in accordance with ISO 527. The result is recorded in megaPascal, or MPa.

VOC Test Method: Volatile Organic Chemical (VOC) testing is performed in accordance with the "VOC Test Method" described below, which is revised from the Toyota™ gas bag method TSM 0508G. The VOC Test Method described below is supported by priority application no. PCT/CN2017/086485; any changes from PCT/CN2017/086485 would be apparent to one of ordinary skill in the art as typographical or clerical changes without addition of new matter. In the following working examples, samples are prepared by weighing each component and extruding using a Coperon 18 mm extruder. The compounds are granulated into small pellets by a side cutter granulator. The granulated compounds are used for Total Volatile Organic Chemical (TVOC) testing using the VOC Test Method described below.

The VOC Test Method is performed by weighing 200 g of a sample into a 10 liter (L) gas volume Tedlar™ PVF (polyvinyl fluoride) bag (from Delin Co. ltd, China), and then feeding 5 L of nitrogen into the bag. The bag is then stored at 65° C. for two hours before analysis. Further details of the VOC Test Method are discussed below.

Carbonyl analysis is performed with a 4 liter sample from the bag. The sample is derivatized with dinitrophenylhydrazine (DNPH). Then, the carbonyl compounds are extracted and injected into a high-performance liquid chromatography (HPLC) column and separated using gradient elution. The separated compounds are then quantified by UV detection at 360 nm, with a detection limit of 0.01 mg/m$^3$. Carbonyl analysis provides the concentration of aldehydes, such as formaldehyde, acetaldehyde, acrolein, propionaldehyde, and crotonaldehyde present in the sample. Further details of the carbonyl analysis is provided in the paragraph below, as well as the HPLC conditions of Table 1.

DNPH cartridges (CNWBOND DNPH-Silica cartridge, 350 mg, Cat. No. SEEQ-144102, Anple Co. Ltd.) are employed to absorb the carbonyls emitted from the gas bag. The sampling speed is 330 mL/min and the sampling time is 13 min. After absorption, the DNPH cartridges are eluted with 1 gram (precisely weighed) of ACN, and the ACN solution is analyzed by HPLC to quantify the carbonyls in the sample. The standard solution with six DNPH derivatives (TO11A carbonyl-DNPH mix, Cat. No. 48149-U, 15 ppm for each individual compound, Supelco Co. Ltd.) is diluted by acetonitrile, and the final solution (0.794 ppm wt/wt) is restored in a 2 mL vial for instrument calibration at −4° C. (refrigerator). The 0.794 ppm (wt/wt) standard solution is injected into the HPLC system as a one point external standard for quantification of carbonyls in the sample. The first two peaks are identified as formaldehyde and acetaldehyde according to the standard specification. The response factor is calculated for each derivative according to the formula below:

$$\text{Response factor } i = \frac{\text{Peak Area } i}{0.794}$$

Where:
Response factor i=Response factor of derivative i
Peak Area i=Peak Area of derivative i in standard solution
0.794=standard concentration of 0.794 ppm The concentration of the aldehyde-DNPH derivative in the sample solution is calculated based on the formula below:

$$\text{Concentration of } i = \frac{\text{Peak Area } i}{\text{Response factor } i}$$

Where:
Concentration of i=Conc. of aldehyde-DNPH derivative in sample solution
Peak Area i=Peak Area of Derivative i in sample solution
Response factor i=Response factor of derivative i
The HPLC conditions are shown below in Table 1.

TABLE 1

| Instrument: | Agilent 1200 HPLC | | | |
|---|---|---|---|---|
| Column: | Supelco Ascentis Express C18, 15 cm * 4.6 mm, 2.7 um | | | |
| Mobile Phase: | Solvent A: 0.1% $H_3PO_4$ in Acetonitrile (ACN) | | | |
| | Solvent B: 0.1% $H_3PO_4$ in DI water | | | |
| Column Oven: | 15° C. | | | |
| Detection: | DAD detector at 360 nm | | | |
| Gradient: | Time (min) | % A | % B | Flow(ml/min) |
| | 0 | 45 | 55 | 1 |
| | 7 | 45 | 55 | 1 |
| | 14 | 50 | 50 | 1 |
| | 20 | 85 | 15 | 1 |
| | 25 | 100 | 0 | 1 |
| Equilibration Time: | 5 min | | | |
| Injection: | 10 uL | | | |

Differential Scanning calorimetry (DSC): Glass transition temperature (Tg) of a polymer is measured by DSC. 5-10 milligram (mg) of a sample is analyzed in a crimped aluminum pan on a TA Instrument DSC Q2000 fitted with an auto-sampler under nitrogen. Tg measurement by DSC is conducted for 3 cycles: $1^{st}$ cycle: from −60° C. to 160° C., 10 degree Celsius per minute (° C./min), and hold for 3 minutes (min); $2^{nd}$ cycle: from 160° C. to −60° C., 10° C./min, hold for 3 min; and $3^{rd}$ cycle: from −60° C. to 160° C., 10° C./min, and hold for 3 min. Tg is obtained from the $3^{rd}$ cycle by the half height method.

Gel Permeation Chromatography (GPC): Molecular weight of a polymer is measured by GPC analysis using Agilent 1200. The sample is dissolved in tetrahydrofuran (THF)/formic acid (FA) (5%) with a concentration of 2 mg/mL and then filtered through 0.45 μm polytetrafluoroethylene (PTFE) filter prior to the GPC analysis. The GPC analysis is conducted using the following conditions:

Column: One PLgel GUARD columns (10 μm, 50×7.5 mm), One Mixed B columns (7.8×300 mm) in tandem; column temperature: 40° C.; mobile phase: THF/FA (5%); flow rate: 1.0 mL/minute; injection volume: 100 μL; detector: Agilent Refractive Index detector, 40° C.; and calibration curve: PL Polystyrene Narrow standards with molecular weights ranging from 2329000 to 580 g/mol, using polynom 3 fitness.

2. Materials

The materials used in the examples are provided in Table 2 below.

TABLE 2

| Material | Description/Properties | Source |
|---|---|---|
| YUPLENE ™ BX3900 | propylene impact copolymer density = 0.90 g/cc (ASTM D792) MFR = 60 g/10 min (ASTM D1238, 230° C./2.16 kg) | SK Global Chemical |
| ENGAGE ™ 8200 | polyolefin elastomer ethylene/octene copolymer density = 0.870 g/cc (ASTM D792) MI = 5 g/10 min (ASTM D792, 190° C./2.16 kg) | The Dow Chemical Company |
| Lonzamon ™ AATMP | AATMP ((2-ethyl-2-(((3-oxobutanoyl)oxy)methyl)propane-1,3-diyl bis(3-oxobutanoate) | Lonza Co. Ltd. |
| JetFil ™ 700 | talc | IMERYS |
| IRGANOX ™ B 225 | Antioxidant containing a blend of 50 wt % tris(2,4-ditert-butylphenyl)phosphite and 50 wt % pentaerythritol tetrakis[3-[3,5-di-tert-butyl-4-hydroxyphenyl][propionate] | BASF |

3. Protocols a. Preparation of Inventive Examples 1-2 and Comparative Sample 1

The comparative sample and inventive examples are each prepared by weighing each component into a Coperon™ 18 mm extruder and extruding the composition. After extrusion, the composition is granulated into small pellets using a side cutter granulator manufactured by LABTECH Engineering company, Model: LSC-108. Pellets have a diameter of 2.3-3.0 mm and a length of 2.3-3.0 mm. The pellets are then molded into samples for testing. Table 3 shows the amount, in phr and approximate weight percent, of each component included in the example and comparative sample compositions.

The pellets are tested for Volatile Organic Chemicals (VOC) via the VOC Method described above. The results are shown in Table 3.

The pellets are also tested for mechanical properties. The results are shown in Table 3.

TABLE 3

|  | CS 1 | Ex. 1 | Ex. 2 |
|---|---|---|---|
| Components in phr | | | |
| YUPLENE™ BX3900 (phr) | 75 | 75 | 75 |
| ENGAGE™ 8200 (phr) | 25 | 25 | 25 |
| Lonzamon™ AATMP | — | 0.5 | 0.2 |
| JetFil™ 700 (phr) | 20 | 20 | 20 |
| IRGANOX™ B 225 (phr) | 0.3 | 0.3 | 0.3 |
| Components in approximate Weight Percent | | | |
| YUPLENE™ BX3900 (wt %) | 62.34 | 62.09 | 62.24 |
| ENGAGE™ 8200 (wt %) | 20.78 | 20.70 | 20.75 |
| Lonzamon™ AATMP | — | 0.41 | 0.16 |
| JetFil™ 700 (wt %) | 16.63 | 16.55 | 16.60 |
| IRGANOX™ B 225 (wt %) | 0.25 | 0.25 | 0.25 |
| Aldehyde VOC Concentrations | | | |
| Formaldehyde (mg/m$^3$) | 0.21 | ND | ND |
| Acetaldehyde (mg/m$^3$) | 1.39 | ND | 0.09 |
| Acrolein (mg/m$^3$) | ND | ND | ND |
| Propionaldehyde (mg/m$^3$) | 0.17 | ND | 0.1 |
| Crotonaldehyde (mg/m$^3$) | ND | ND | ND |
| Mechanical Properties | | | |
| Flexural Young's Modulus (MPa) | 1809 | 1792 | 1740 |
| Flexural Yield Strength (MPa) | 31 | 31 | 31 |
| Tensile Modulus (MPa) | 1830 | 1800 | 1740 |
| Tensile Yield Strength (MPa) | 20 | 21 | 21 |
| Notched IZOD (10P) @ 23° C. (kJ/m$^2$) | 32.6 | 32.9 | 31.5 |
| Notched IZOD (10C) @ −30° C. (kJ/m$^2$) | 4.30 | 4.31 | 4.24 |

CS = Comparative Sample.
ND = Not Detectable. A sample with an aldehyde content that is not detectable has an aldehyde content that is less than the detection limit of 0.01 mg/m$^3$ (i.e., from 0 mg/m$^3$ to less than 0.01 mg/m$^3$).

4. Results

As shown in Table 3, Inventive Examples 1-2, which are compositions containing (A) polypropylene (YUPLENE™ BX3900), (B) polyolefin elastomer (ENGAGE™ 8200), (C) a polyacetoacetate compound (i.e., trimethylolpropane tri-acetoacetate), (D) a talc additive (JetFil™ 700) and an antioxidant additive (IRGANOX™ B 225) advantageously exhibit reduced aldehyde concentrations compared to CS 1, which lacks a polyacetoacetate compound and is representative of the state of the art.

Without wishing to be bound by any particular theory, Applicant believes the methylene groups react with aldehydes (e.g., formaldehyde, acetaldehyde, acrolein, propionaldehyde, and crotonaldehyde) present in the composition, which advantageously abates (i.e., reduces) the aldehyde concentration of the composition.

Furthermore, Inventive Examples 1-2 surprisingly and unexpectedly exhibit similar, and in some cases improved, mechanical properties compared to CS 1, indicating Inventive Examples 1-2 are suitable for making articles such as automobile interior parts.

It is further noted that inventive compositions of the present disclosure are cost effective by limiting the amount of expensive components, such as polyacetoacetate compounds.

It is specifically intended that the present disclosure not be limited to the embodiments and illustrations contained herein, but include modified forms of those embodiments including portions of the embodiments and combinations of elements of different embodiments as within the scope of the following claims.

What is claimed is:

1. A composition comprising:
   (A) a polypropylene polymer;
   (B) a polyolefin elastomer;
   (C) a polyacetoacetate compound; and
   (D) an additive component;
   wherein the polyacetoacetate compound has the Formula (I):

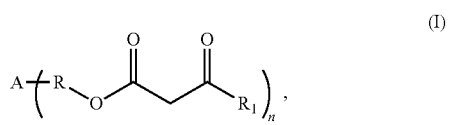

wherein
   A is a polymer backbone, a $C_1$-$C_{30}$ substituted or unsubstituted linear or branched alkyl, aryl, arylalkyl, or alkaryl group, wherein the substituents may be one or more O, N, S, halogen, or phosphine;
   R is a bond or a $C_1$-$C_{30}$ linear or branched alkyl, aryl, arylalkyl, or alkaryl group;
   $R_1$ is a substituted or unsubstituted $C_1$-$C_6$ alkyl or a substituted or unsubstituted aryl group; and
   n is 2 to 100.

2. A composition comprising:
(A) from 50 wt % to 85 wt % of a polypropylene polymer;
(B) from 5 wt % to 35 wt % of a polyolefin elastomer;
(C) from 0.01 wt % to 10 wt % of a polyacetoacetate compound; and
(D) from 0 wt % to 30 wt % of an additive component;
wherein the polyacetoacetate compound has the Formula (I):

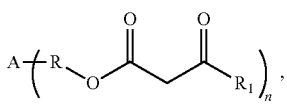

wherein
A is a polymer backbone, a $C_1$-$C_{30}$ substituted or unsubstituted linear or branched alkyl, aryl, arylalkyl, or alkaryl group, wherein the substituents may be one or more O, N, S, halogen, or phosphine;
R is a bond or a $C_1$-$C_{30}$ linear or branched alkyl, aryl, arylalkyl, or alkaryl group;
$R_1$ is a substituted or unsubstituted $C_1$-$C_6$ alkyl or a substituted or unsubstituted aryl group; and
n is 2 to 100.

3. The composition of claim 1, wherein R is a $C_1$ alkyl group or a substituted or unsubstituted ether moiety.

4. The composition of claim 1, wherein $R_1$ is a $C_1$ or $C_2$ alkyl group.

5. The composition of claim 1, wherein n is 2 to 20.

6. The composition of claim 1, wherein the polyacetoacetate compound is selected from the group consisting of the following:

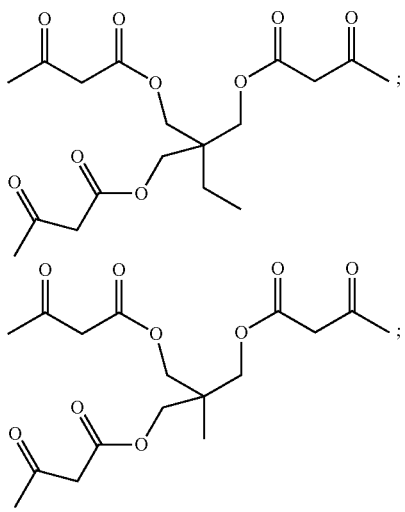

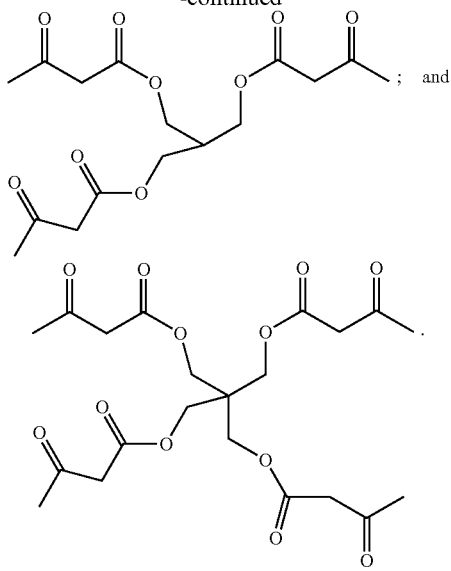

7. The composition of claim 1, wherein the polyolefin elastomer is an ethylene/α-olefin copolymer.

8. The composition of claim 1 comprising less than 0.01 mg/m³ formaldehyde, as measured in accordance with the VOC Test Method.

9. The composition of claim 1 comprising less than 0.10 mg/m³ acetaldehyde, as measured in accordance with the VOC Test Method.

10. The composition of claim 1 comprising less than or equal to 0.10 mg/m³ propionaldehyde, as measured in accordance with the VOC Test Method.

11. The composition of claim 1 comprising:
less than 0.01 mg/m³ formaldehyde, as measured in accordance with the VOC Test Method;
less than 0.10 mg/m³ acetaldehyde, as measured in accordance with the VOC Test Method;
less than 0.01 mg/m³ acrolein, as measured in accordance with the VOC Test Method;
less than or equal to 0.10 mg/m³ propionaldehyde, as measured in accordance with the VOC Test Method; and
less than 0.01 mg/m³ crotonaldehyde, as measured in accordance with the VOC Test Method.

12. The composition of claim 1 comprising:
a flexural modulus and tensile modulus of greater than 1700 MPa;
a flexural yield strength of greater than 30 MPa; and
a tensile yield strength of greater than 20 MPa.

13. The composition of claim 1 comprising:
an impact strength at 23° C. of greater than 31 kJ/m²; and
an impact strength at −30° C. of greater than 4.20 kJ/m².

14. An article made from the composition of claim 1.

15. The article of claim 14 in the form of an automobile interior part.

* * * * *